United States Patent

[11] 3,561,789

| [72] | Inventors | Larry F. Stikeleather<br>Greendale;<br>Craig W. Cannon, New Berlin, Wis. |
|---|---|---|
| [21] | Appl. No. | 778,070 |
| [22] | Filed | Nov. 22, 1968 |
| [45] | Patented | Feb. 9, 1971 |
| [73] | Assignee | Allis-Chalmers Manufacturing Company<br>Milwaukee, Wis. |

[54] TRACTOR HITCH
9 Claims, 6 Drawing Figs.

[52] U.S. Cl. .................................................. 280/479,
 280/461
[51] Int. Cl. .................................................. B60d 1/04
[50] Field of Search .......................................... 280/461,
 461(.1), 479; 172/439, 272

[56] References Cited
UNITED STATES PATENTS

| 3,421,779 | 1/1969 | Shelby | 280/479 |
| 3,427,046 | 2/1969 | Sommer | 280/461(.1) |
| 3,432,184 | 3/1969 | Tweedy | 280/479 |

*Primary Examiner*—Leo Friaglia
*Attorneys*—Arthur L. Nelson, Kenneth C. McKivett and Robert B. Benson

ABSTRACT: A powerized three-point hitch carrying a hitch adapter for quick hitching to an implement. The three-point hitch is powered by any suitable means to provide horizontal and vertical movement of the hitch adapter.

Inventors
Larry F. Stikeleather
Craig W. Cannon

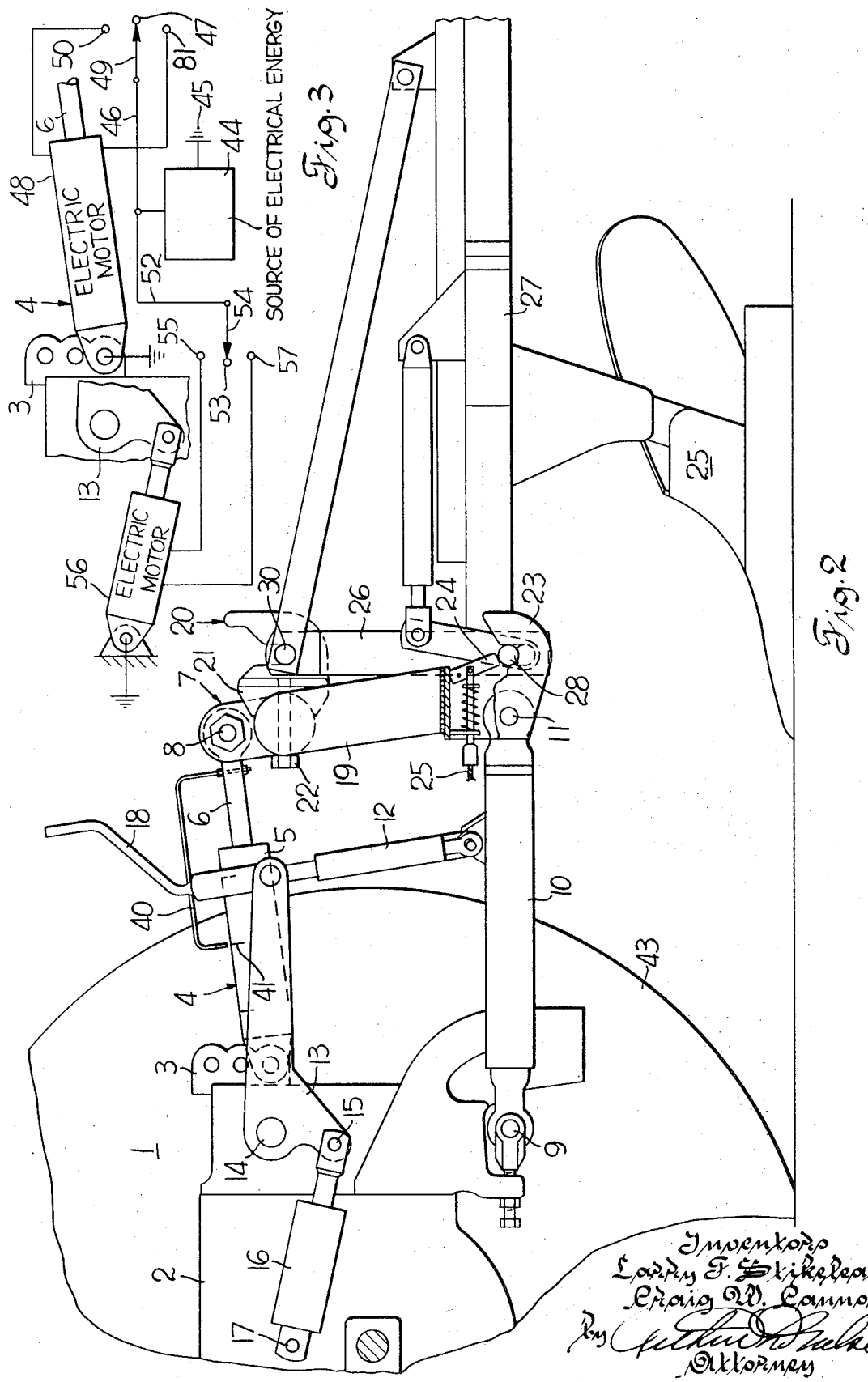

PATENTED FEB 9 1971

Inventors
Larry F. Stikeleather
Craig W. Cannon

Attorney

TRACTOR HITCH

This invention relates to the tractor hitch and more particularly to a power actuated three-point hitch carrying a quick-hitch adapter for hitching the tractor to an implement. The powered means provides horizontal and vertical movement of the three-point hitch adapter to facilitate hitching to an implement.

The conventional hitching arrangements presently used require an operator to dismount from the tractor and manually engage three load carrying links of the three-point hitch and manually insert locking pins.

A more recent innovation for connecting tractors to implements uses a hitch adapter which is essentially a frame having three hooks extending rearwardly and which is carried on the end of the three-point hitch. The hitch adapter is connected directly to the implement mast carrying crossbars and pins to connect the tractor to the implement. Even these hitches often require the operator to dismount from the tractor. When the operator is standing between the tractor and the implement there is always the danger of getting caught between the tractor and implement in the event the tractor should roll back or even when the tractor is moved rearwardly by the controls. A further danger is in maneuvering the implement to get it into proper alignment for connection to the tractor hitch. With the increase in power of the modern tractor the implements are larger and become increasingly difficult to move manually to align for hitching to the tractor. This is particularly true when hitching is done at the crest of a hill or ridge or if the implement is tipped on its side. The hitch adapter will not engage all hitch points of the implement and accordingly the operator must move the implement in some manner to facilitate connection to the tractor hitch.

Accordingly the present hitch arrangement incorporates a powered upper link which unlike previous hitching arrangements provides flexibility in using the hitch adapter to overcome misalignment between the tractor and the implement. The upper link is powered by a suitable linear actuator which may be electrically, hydraulically or mechanically whichever is best suited for the particular operation. For the purpose of illustration the hydraulic cylinder with a double-acting piston will be considered.

The power-extendible and contractable upper link enhances the hitching operation by allowing the hitch adapter to be pivoted rearwardly or forwardly by extension or retraction of the actuator. The hitch adapter carries a top hook adjacent the connection for the top link which extends rearwardly on the adapter. Two lower hooks are also formed on the hitch adapter adjacent the connection of the two lower draft arms. As the powerized upper link extends the top hook goes rearwardly for engagement with the crosspin on the top of the implement mast. Since most implements have their center of mass below and to the rear of this point, implement weight can be used effectively to negotiate proper alignment between the tractor and the implement. With this single point hooked the implement can be lifted with the tractor lift which is a powerized means connected to the draft arms. The power means operates through the lift links which are connected to the draft arms. Once the implement is positioned with its mast substantially in a vertical position the draft arms can then be lowered and the lower hooks can be reengaged with the crossbars of the implement to complete the hitching operation.

It is the object of this invention to provide a powered upper link to extend or retract the upper link in response to suitable controls for controlling movement at a hitch adapter.

It is another object of this invention to provide a powered linearly operated upper link and powered draft arms to lift the arms for controlling a hitch adapter in response to suitable manual control means.

It is the further object of this invention to provide a three-point hitch in combination with a hitch adapter mounted on the tractor with a powered upper link and powered draft arms to facilitate hitching the tractor to an implement.

It is the further object of this invention to provide a three-point hitch with a hitch adapter having power upper link for linear extension and retraction and powered lift links on the draft arms with manual control means to facilitate hitching.

It is the further object of this invention to provide a three-point hitch and hitch adapter having hydraulic, electrical or mechanical, powered means for extension or contraction of the upper links or lifting or lowering of the draft arms to provide improved implement control.

The objects of this invention are accomplished by the use of the three-point hitch on the tractor carrying a hitch adapter. The hitch adapter is connected at three points such as the upper link and the two draft arms. The hitch adapter carries two lower hooks adjacent the connection of the draft arms and the single upper hook which is adjacent the connection for the upper link. The upper link is powered to linearly extend or retract the link which operates to pivot the hitch adapter about its two connections to the draft arms. The draft arms are connected by lift links carried on a bellcrank which is powerized. The bellcrank pivots in a manner to lift the draft arms about their forward connections to the tractor. Accordingly, the adapter may be tilted rearwardly or forwardly or lifted vertically or lowered. This movement of hitch adapter facilitates its connection to the implement. By extending the upper link rearwardly from the tractor the upper hook may be positioned to engage a crosspin in the implement mast. In this manner, the implement can then be drawn toward the tractor and lifted at its front end to substantially align the implement for engagement of the lower draft hooks. A slight lowering of the draft arms also lowers the upper hook but does not completely release the crosspin in the mast. Accordingly, the lower hooks may then be positioned immediately below the crossbars on the implement mast while the upper hook receives the crosspin in the implement mast. As the hitch adapter is then raised the hitching of the tractor to the implement is complete.

The preferred embodiments of this invention will be described in subsequent paragraphs and are illustrated in the attached drawings.

FIG. 2 illustrates the tractor hitched to the implement.

FIG. 3 illustrates a modification with the actuators of the tractor employing an electrical actuating means.

Figure 1:
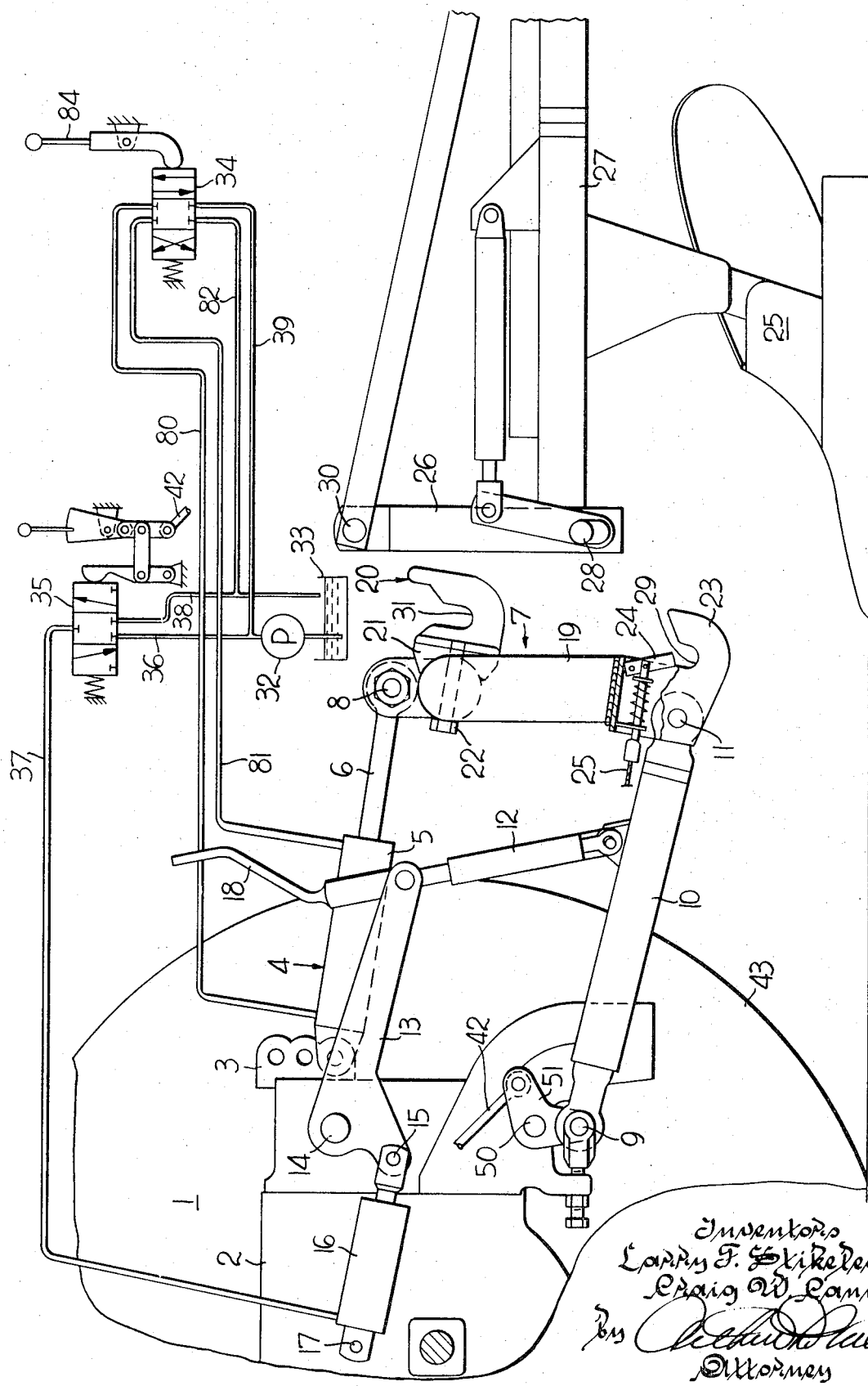
FIG. 1 illustrates the hitching arrangement of the tractor and implement with a hydraulic schematic diagram.

Referring to the drawings FIG. 1 illustrates a tractor 1 and gear case 2. The gear case 2 carries a bracket 3 for connection to an upper link 4 which for the purposes of illustration is a hydraulic actuator 5 having a rod 6 pivotally connected to the hitch adapter 7 by means of the pin 8. The gear case 2 also carries a cross-shaft 9 pivotally connected to a draft arm 10 which extends rearwardly to pivotally connect the hitch adapter 7 by means of a pin 11. The cross-shaft 9 is connected by crank arm 51 to the torsion bar 50. The draft arms may be lifted or lowered by means of a lift link 12 pivotally connected to the bellcrank 13 pivotally supported by the shaft 14 in the gear case 2. The bellcrank 13 is also pivotally connected by a pin 15 to the hydraulic cylinder 16 which is pivotally connected to the gear case 2 by the pin 17. The lift link 12 is provided with a jackscrew having a crank 18 to shorten or extend the link 12 to a suitable dimension. The hitch adapter 7 comprises the basic frame 19 and an upper hook 20 bolted to a bracket 21 by means of the bolts 22. The hitch adapter 7 also forms a lower hook 23 having a latch 24 which can be manually operated by the cable 25. The hitch adapter 7 pivots about the pin 11 when the actuator 5 is operated. When the actuator 16 is operated, the links 12 lift or lower the draft arms 10 and accordingly the hitch adapter itself pivots about the pins 8 and 11.

For the purposes of illustration a plow 25 is shown with a mast 26 extending upwardly on the front end of the frame 27. The crossbars 28 are adapted for reception within the opening 29 of the lower hooks 23. The mast also carries a crosspin 30 in the upper end which is adapted for reception in the opening 31 of the upper hook 20. The tractor and implement as shown may be brought together by reversing the tractor and then raising the hitch adapter 7 to receive a crossbar 28 and the crosspin 30 in their respective hooks 23 and 20.

The hydraulic system as shown illustrates a means to supply pressurized fluid to the powerized upper link 4 and the actuator 16 operating the bellcrank 13. The pump 32 receives fluid from the reservoir 33 and supplies pressurized fluid to the valve 34 and 35 through conduits 39 and 36.

Pressurized fluid from valves 34 and 35 flows to the actuators 5 and 16. The conduit 37 connects valve 35 to actuator 16, and conduits 80 and 81 connect valve 34 to actuator 5. Conduits 38 and 82 provide a means for return of hydraulic fluid to the reservoir 33. Valve 35 is shown in neutral and when it connects the supply pressurized fluid to the actuator 16 the bellcrank 13 lifts the draft arm 10 by the lift link 12. The weight of the lift link will return the bellcrank to whatever position is desired when the valve 35 is positioned to release the pressurized fluid in actuator 16 through conduit 38.

The valve 34 also has a neutral position as shown in FIG. 1 and actuating position whereby pressurized fluid extends the rod 6 of the actuator 4 which is illustrated when the valve is moved forwardly as the lever 84 is tilted rearwardly. The actuator 5 is retracted when the valve is moved rearwardly and pressurized fluid flows into the rear end of the actuator 5 while the fluid on the opposite side of the piston is allowed to return to the reservoir 33.

Referring to FIG. 2 the implement 25 is shown connected to the tractor 1. The upper link actuator 5 is contracted which tilts the hitch adapter 7 forwardly. The lower draft arms 10 have been raised as the actuator 16 extends to pivot the bellcrank 13 about the shaft 14. The lower hooks 23 receive the crossbar 28 and are latched by means of the latch 24 to retain the hitch adapter 7. In this position the crosspin 30 is received in the upper hook 20 and the implement is shown in the operating position. The indicator arm 40 is connected to the rod 6 and indicates the operating range of the upper link 4 which may be obtained by operating the valve 34. The control linkage 42 receives the signal from the torsion bar connection responsive to the draft arms 10 for controlling the weight distribution on the rear wheels 43 for proper traction of the tractor.

FIG. 3 illustrates an electrical means for actuating the upper link 4 and the draft arms 10. The source of electrical energy 44 is connected to ground 45 and has an electrical conductor 46 to a neutral point 47. Electrical motor 48 in the upper link 4 extends or retracts the rod 6 as the motor is operated. A motor is operated in one direction when the switch 49 is connected to the terminal 50 and operates in the opposite direction when the switch 49 is connected to the terminal 81.

An electrical conductor 52 is connected to a neutral terminal 53. The switch 54 may be connected to terminal 55 to operate the electric motor 56, in one direction to pivot the bellcrank 13 and to lift the draft arms 10 or may be operated by connecting switch 54 to terminal 57 to lower the draft arms 10 as the bellcrank 13 moves in the opposite direction. FIG. 3 illustrates an electrical means of actuating the hitch mechanism.

Figure 4:
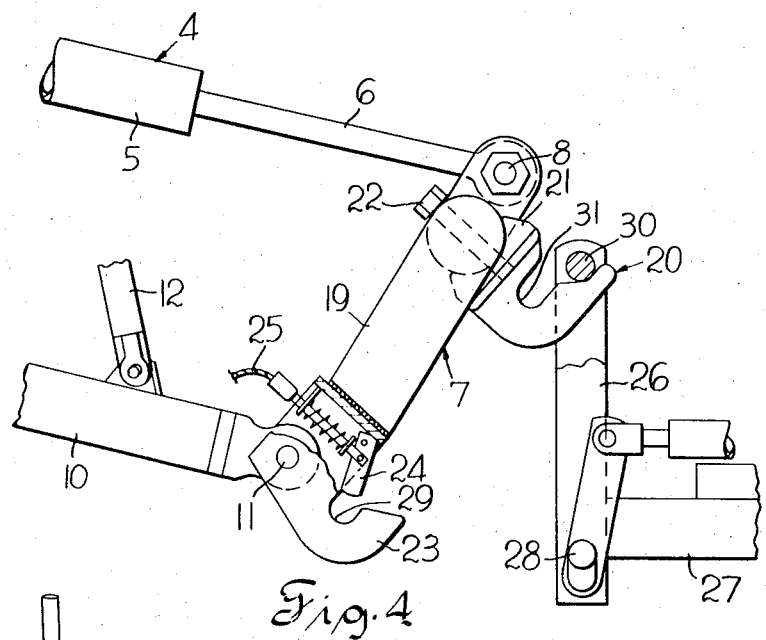
FIG. 4 illustrates the hitch adapter extended rearwardly for engagement of the crosspin in implement mast.

FIG. 4 illustrates the upper link 4 in the extended position in which the rod 6 pivots the hitch adapter 7 rearwardly about the pins 11 on the lower draft arms 10. The upper hook 20 extends rearwardly and is brought up under the crosspin 30 on the mast 26. In the event the implement is tilted laterally the upper hook 20 is narrow at its upper end to permit inserting the hook 20 in the opening immediately under the crosspin 30. The upper link actuator 4 may then be retracted which in turn will lift the implement 25 and move it forwardly to facilitate complete engagement with the tractor hitch.

Figure 6:
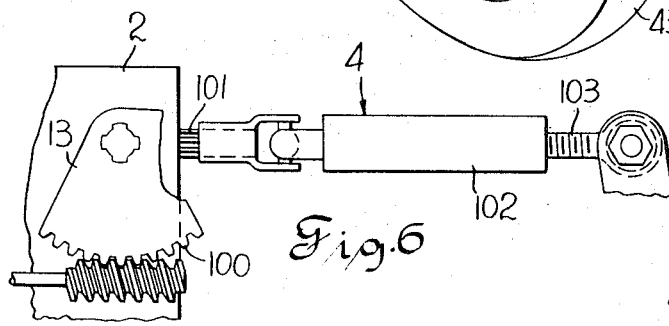
FIG. 6 illustrates a mechanically powered hitch adapter.

FIG. 6 shows the bellcrank 13 defining a gear segment 100 power driven by a worm to lift the draft arms 10. The upper link 4 includes a drive shaft 101 driving the sleeve 102 to extend or withdraw rod 103. This provides a mechanical means of operating the upper link 4 or draft arms 10.

Figure 5:
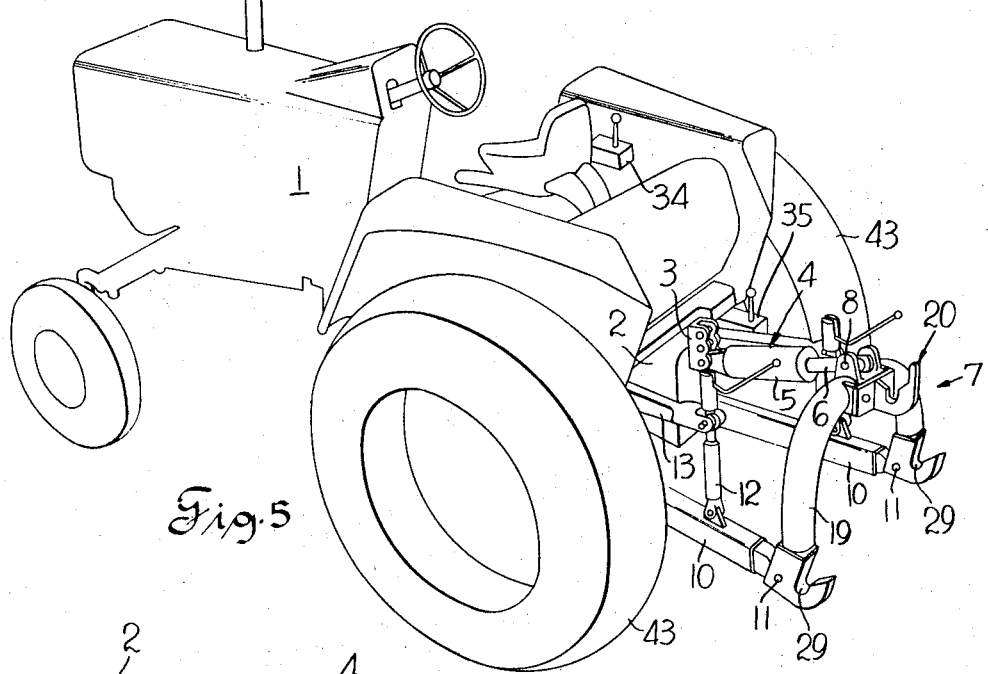
FIG. 5 illustrates a three-dimensional view of the tractor and the three-point hitch carrying the hitch adapter.

FIG. 5 illustrates the tractor in a three-dimensional view in which the lower draft arms carry a lower end of the hitch adapter 7. The upper link 4 carries the upper end of the hitch adapter 7. The bellcranks 13 are connected to the lift links 12 which raises or lowers the draft arms 10. A three-dimensional view shown on FIG. 5 shows the relative position of the various components in the hitch of the tractor.

The operation of the hitch mechanism will be described in the following paragraphs.

Referring to FIG. 5 the tractor is shown with the hitch in three-dimension. The upper link 4 is pivotally connected to the gear case 2 and extends rearwardly to pivotally connect the upper portion of the hitch adapter 7. The lower draft arms 10 are pivotally connected on the gear case 2 and pivotally connected to the lower ends of the hitch adapter 7 on their rear end. The bellcranks 13 are pivotally connected to the rear end. The bellcranks 13 are pivotally connected to the gear case 2 and are operated by the cylinders 16 which pivots the bellcrank 13 to lift the lift links 12 and in turn pivotally raise the draft arms 10. The hitching mechanism when connected normally operates automatically to provide a leveling of the implement and depth control when the implement is in working position. This position is shown on FIG. 2.

The implement may be slightly lower and possibly tilted to one side. As shown in FIG. 4 the upper link 4 is extended by means of operation of valve 34. When the valve is manually operated to cause pressurized fluid from the pump 32 to flow through the conduit 80, the cylinder 5 extends the link 4. An extending of the rod 6 of cylinder 5 will produce a tilting of the hitch adapter 7 as indicated in FIG. 4.

It is also understood that when the valve 35 is manually operated to cause the actuator 16 to extend thereby pivoting the bellcrank 13 it will cause the lift links 12 to raise. When the valve 35 is in this position pressurized fluid from the pump 32 will flow through the conduit 37 to actuator 16 to raise the links. When the valve is positioned to allow fluid from the actuator 16 to flow through conduit 37 it will permit the links and the hitch to lower slightly as indicated in FIG. 4. This places the hook 20 in a lowered rearwardly extending position relative to the hitch. The tractor is then backed rearwardly until the point of the hook 20 moves underneath the crosspin 30 of the mast 26 as shown in FIG. 4. In this position the actuator 16 can be extended causing the bellcrank to lift the lower draft arms 10 and also the upper link 4 may be retracted by means of the cylinder 5 by the use of valve 34. Both of these movements will cause the lifting of the hook 20 which in turn will lift the front end of the implement. The front end of the implement will then be drawn forwardly to a point adjacent to the hitch adapter 7. The hitch adapter 7 can then be lowered by means of the cylinder 16 which will drop the draft arms 10 and correspondingly lower the upper link 4 on its rearward end. When the hitch adapter 7 is lowered sufficiently the tractor is then backed slightly more until hook 20 is below the crosspin 30 of the mast 26 and the lower hooks 23 are positioned immediately below the crossbars 28. The actuator 16 is then caused to extend for lifting the bellcrank 13 and lift links 12 as well as the draft arms 10. This will cause the crossbars 28 on the implement 25 to raise and become latched and locked by means of the latch 24. Simultaneously the crosspin 30 in the mast 26 will also be received in the hook 20. This position is shown in FIG. 2.

When the implement is attached the actuators 16 and 5 are placed in operating position. Indicator 40 and scale 41 show the operating range of actuator 5. The system is then in automatic control and the vehicle operates according to the rotation of torsion bar 50 caused by the draft load on the draft links 10. The crank arm 51 operates the control valve 35 which in turn receives fluid from the pump 32. The weight distribution system operates in response to the draft load on the draft arms 10 which is preset to maintain the normal operating condition of the implement. It is understood that the system has also means for providing a lift position for the implement 25 which will raise the implement for the travel position. Suitable valve control may be effected through the valves 34 and 35.

The manual control of valve 34 and 35 provides a means whereby the hitch adapter 7 can be moved rearwardly, forwardly, upwardly, downwardly by merely controlling the valves 34 and 35. This system eliminates the need for the operator to dismount from the vehicle to wrestle with the implement in order to get the proper alignment for engaging the hitch on the tractor to the implement. Various types of actuating means might be used to provide this vertical and horizontal movement of the hitch adapter. It is understood that the system which provides powerized means to provide this action is essentially the feature which eliminates the need to dismount from the vehicle and manually engage and disengage the implement. The latch 24 can be disengaged and the hitch adapter 7 can be controlled by operation of the valves from the operator control station. This system adapts well to the larger type hitching devices for tractors.

We claim:

1. A vehicle three-point hitching means, including a powered upper link adapted for connection to the tractor and having power means for extension and contraction of the link, a pair of powered lower draft arms adapted for connection to the tractor having power means for raising and lowering the draft arms, a hitch adapter pivotally connected to the rearward ends of said upper link and said draft arms including: an upper hook connected to the upper portion of said adapter for engaging a crosspin in the mast of an implement; two lower hooks connected to the lower portion of said adapter for engaging crossbars in the lower portion of the mast of an implement; a source of power connected to the power means of said link and said arms; control means intermediate said source of power and the power means on said link and said arms to thereby move said hitch adapter to extend, withdraw, raise and lower said hitch adapter.

2. A three-point vehicle hitching means as set forth in claim 1 wherein the source of power comprises a source of pressurized fluid and the power means in said link and said draft arms comprise fluid actuators.

3. A three-point vehicle hitching means as set forth in claim 1 wherein the source of power comprises a source of electrical energy and power means in said link and said draft arms comprise electrical motors to thereby provide power for moving said hitch adapter.

4. A vehicle three-point hitching means as set forth in claim 1 wherein said source of power comprise the engine and said power means in said link and said draft arms include a mechanical means driven mechanically from said engine.

5. A vehicle three-point hitching means as set forth in claim 1 wherein the control means for operating the power means in the link and draft arms include manual controls positioned on the tractor to eliminate the need for the operator to dismount from the tractor in operating the hitching means.

6. A vehicle three-point hitching means as set forth in claim 1 wherein the hitch adapter includes means pivotally connecting the rearward ends of the upper link and lower draft arms, and means connecting the hooks for extending rearwardly from points adjacent said pivotal connections with said upper link and said lower draft arms, said lower hooks including latching means to lock the crossbars on said implement mast in the hooks once the crossbars are engaged.

7. A vehicle three-point hitching means as set forth in claim 1 wherein said power means operating the draft arms comprise manually controlled power actuators to permit a lowering and raising of the draft arms to automatically engage and latch an implement once the implement is in substantial alignment with the hitch adapter.

8. A vehicle three-point hitching means as set forth in claim 1 wherein said power means operating said draft arms include power actuators, said power means operating said upper link includes a double-acting power actuator, said control means include manually controlled means to provide control for power retraction of the upper link to draw the implement toward the vehicle while the lower draft arms pivotally support the hitch adapter to maintain the upright position on the implement during this movement.

9. A vehicle three-point hitching means as set forth in claim 1 wherein said upper link includes a double-action power actuator with a length indicator to show the length of said upper link.